US007610573B1

(12) United States Patent
Chan et al.

(10) Patent No.: US 7,610,573 B1
(45) Date of Patent: Oct. 27, 2009

(54) IMPLEMENTATION OF ALTERNATE SOLUTIONS IN TECHNOLOGY MAPPING AND PLACEMENT

(75) Inventors: Vi Chi Chan, Hong Kong (HK); Tetse Jang, San Jose, CA (US); Sridhar Krishnamurthy, San Jose, CA (US); Kevin Chung, Toronto (CA)

(73) Assignee: XILINX, Inc., San Jose, CA (US)

( * ) Notice: Subject to any disclaimer, the term of this patent is extended or adjusted under 35 U.S.C. 154(b) by 178 days.

(21) Appl. No.: 11/881,307

(22) Filed: Jul. 26, 2007

(51) Int. Cl.
*G06F 17/50* (2006.01)
(52) U.S. Cl. .......................................... 716/18; 716/2
(58) Field of Classification Search .................. 716/1, 716/2, 18
See application file for complete search history.

(56) References Cited

U.S. PATENT DOCUMENTS

| | | | |
|---|---|---|---|
| 6,473,885 B1 * | 10/2002 | Wallace | 716/4 |
| 7,020,855 B2 * | 3/2006 | Wallace | 716/2 |
| 7,100,144 B2 * | 8/2006 | Jacobson et al. | 716/18 |
| 7,249,329 B1 * | 7/2007 | Baeckler et al. | 716/3 |

OTHER PUBLICATIONS

S. Chatterjee et al.; "Reducing Structural Bias in Technology Mapping"; Proceeding of the 2005 IEEE/ACM ICCAD; pp. 1-10.

* cited by examiner

*Primary Examiner*—Jack Chiang
*Assistant Examiner*—Binh C Tat
(74) *Attorney, Agent, or Firm*—Kevin T. Cuenot; LeRoy D. Maunu; Lois D. Cartier

(57) ABSTRACT

A computer-implemented method of implementing a circuit design within a target integrated circuit (IC) can include, during technology mapping of the circuit design, determining a plurality of implementations of at least one sub-circuit of the circuit design and placing the circuit design on the target IC using a primary implementation of the plurality of implementations of the sub-circuit. The primary implementation of the sub-circuit can be selectively replaced with an alternate implementation of the sub-circuit selected from the plurality of implementations of the sub-circuit. The placed circuit design, including either the primary implementation or the alternate implementation of the sub-circuit, can be output.

12 Claims, 4 Drawing Sheets

500

```
┌─────────────────────────────────────────┐
│ Generate a plurality of implementations │
│ for sub-circuits of the circuit design  │
│                                     505 │
└─────────────────────────────────────────┘
                    ↓
┌─────────────────────────────────────────┐
│ Place circuit design using the          │
│ plurality of implementations for at     │
│ least one sub-circuit of the            │
│ circuit design                          │
│                                     510 │
└─────────────────────────────────────────┘
                    ↓
┌─────────────────────────────────────────┐
│ Apply first legalization process        │
│                                     515 │
└─────────────────────────────────────────┘
                    ↓
┌─────────────────────────────────────────┐
│ Optionally prune choice LUTs from       │
│ placement                           520 │
└─────────────────────────────────────────┘
                    ↓
┌─────────────────────────────────────────┐
│ Apply second legalization process       │
│                                     525 │
└─────────────────────────────────────────┘
                    ↓
┌─────────────────────────────────────────┐
│ Output placement                        │
│                                     530 │
└─────────────────────────────────────────┘
```

FIG. 5

IMPLEMENTATION OF ALTERNATE SOLUTIONS IN TECHNOLOGY MAPPING AND PLACEMENT

FIELD OF THE INVENTION

Embodiments of the invention relate to integrated circuit devices (ICs) and, more particularly, to determining alternate technology mapping solutions for use in implementing a circuit design within an IC.

BACKGROUND

Software-based Electronic Design Automation (EDA) tools, in general, can process circuit designs through what is referred to as an implementation flow. Processing the circuit design through an implementation flow prepares the circuit design for implementation within a particular integrated circuit (IC). The circuit design can be specified in programmatic form, e.g., as a netlist, as one or more hardware description language files, or the like. A typical implementation flow entails various phases, or stages, such as synthesis, technology mapping, placing, and routing. The resulting circuit design is transformed into a bitstream that, when loaded into the target IC, configures the target IC to implement the circuit design.

Programmable logic devices (PLDs) are a well-known type of IC that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

In general, the implementation flow that implements a circuit design within an IC is a serial process in which the output of one stage is provided to the next stage as input. For example, the output of the synthesis stage is provided to the technology mapping stage as input. The output from the technology mapping stage is provided to the placement stage as input, etc. This means that the quality of result determined by a particular stage of the implementation flow depends upon the output of each prior stage.

In illustration, the quality of circuit placement determined by the placement stage will be constrained by the particular technology mapping generated by the technology mapping stage. In conventional EDA tools, only the results are passed on to the next stage. Any intermediate data generated by a stage is discarded. When the results are not satisfactory, the designer must restart the implementation flow from the beginning. For example, if placement or routing is not satisfactory, the designer may be forced to re-synthesize the circuit design using different directives or instructions in the hope that a different circuit structure will result in improved placement and/or routing of the circuit design.

SUMMARY

Embodiments of the present invention relate to alternate technology mapping solutions for use in implementing a circuit design within an integrated circuit (IC). One embodiment of the present invention can include a computer-implemented method of implementing a circuit design within a target IC. The method can include, during technology mapping of the circuit design, determining a plurality of implementations of at least one sub-circuit of the circuit design and placing the circuit design on the target IC using a primary implementation of the plurality of implementations of the sub-circuit implementations of the sub-circuit. The primary implementation of the sub-circuit can be selectively replaced with an alternate implementation of the sub-circuit selected from the plurality of implementations of the sub-circuit. The placed circuit design, including either the primary implementation or the alternate implementation of the sub-circuit, can be output.

Determining a plurality of implementations can include determining a plurality of implementations for each of a plurality of sub-circuits of a selected region of the circuit design. Accordingly, selectively replacing the primary implementation can include replacing each primary implementation of each sub-circuit of the selected region with an alternate implementation of the sub-circuit.

When the sub-circuit includes a plurality of nodes of the circuit design, determining a plurality of implementations can include mapping a group of nodes of the sub-circuit to at least one lookup table forming the primary implementation and mapping a group of nodes of the sub-circuit to at least one lookup table forming the alternate implementation, where the group of nodes of the primary implementation is not equal to the group of nodes of the alternate implementation.

In one embodiment, selectively replacing can include identifying a portion of the circuit design that does not conform to a design constraint, selecting at least one sub-circuit of the identified portion, and replacing the primary implementation of the at least one sub-circuit of the identified portion with the alternate implementation of the at least one sub-circuit.

In another embodiment, selectively replacing can include performing a timing analysis upon the placed circuit design, identifying a critical path of the circuit design, and selecting the sub-circuit, wherein the sub-circuit can include a node of the critical path. The primary implementation of the sub-circuit can be replaced with the alternate implementation of the sub-circuit. Selectively replacing further can include accepting the alternate implementation of the sub-circuit according to a further timing analysis of the placed circuit design comprising the alternate implementation of the sub-circuit.

The method further can include, during technology mapping, generating a circuit description that specifies the plurality of implementations of the sub-circuit and providing the circuit description specifying the plurality of implementations to a placer.

Determining a plurality of implementations can include determining an implementation of the sub-circuit including slice logic and determining another implementation of the sub-circuit including non-slice logic. Determining a plurality of implementations also can include determining an implementation including a combination of slice logic and non-slice logic.

Another embodiment of the present invention can include a computer-implemented method of implementing a circuit design within a target IC including, during technology mapping of the circuit design, determining a plurality of implementations of a sub-circuit of the circuit design and placing the circuit design on the target IC, wherein each of the plurality of implementations of the sub-circuit is placed on the target IC concurrently. The method also can include selecting one of the plurality of implementations of the sub-circuit after placement and outputting the placed circuit design specifying the selected implementation of the sub-circuit.

Selecting one of the plurality of implementations can include selecting one of the plurality of implementations according to area, timing, power usage, or any combination thereof. Selecting one of the plurality of implementations further can include eliminating overlap conditions from the circuit design.

Yet another embodiment of the present invention can include a computer program product including a computer-usable medium having computer-usable program code that, when executed by an information processing system, causes the information processing system to perform the various steps and/or functions disclosed herein.

BRIEF DESCRIPTION OF THE DRAWINGS

FIG. 5 is a flow chart illustrating a method of implementing a circuit design in accordance with another embodiment of the present invention.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed herein relate to alternate technology mapping solutions for use in implementing a circuit design within an integrated circuit (IC). During the technology mapping phase of circuit implementation, a plurality of different implementations for each of one or more sub-circuits of the circuit design can be generated. These implementations can be stored, retained with or as part of the circuit design. During the placement stage, different ones of the plurality of implementations for the sub-circuit(s) can be selected and used depending upon one or more evaluation metrics that may be applied to the circuit design.

Retention of the different implementations for a given sub-circuit of the circuit circuit design allows a particular implementation to be selected at a point during the implementation flow where more information and/or more accurate information is available to make an informed decision as to which implementation of the sub-circuit should be used. For example, during or after placement, information such as timing information, area usage information, and/or power consumption information generally is more complete or accurate. For a given sub-circuit of the circuit design, an implementation from a plurality of implementations generated for that sub-circuit can be selected and used based upon time, area usage, power consumption, or any other type of information regarding the circuit design that may be available to the EDA tool.

Figure 1:
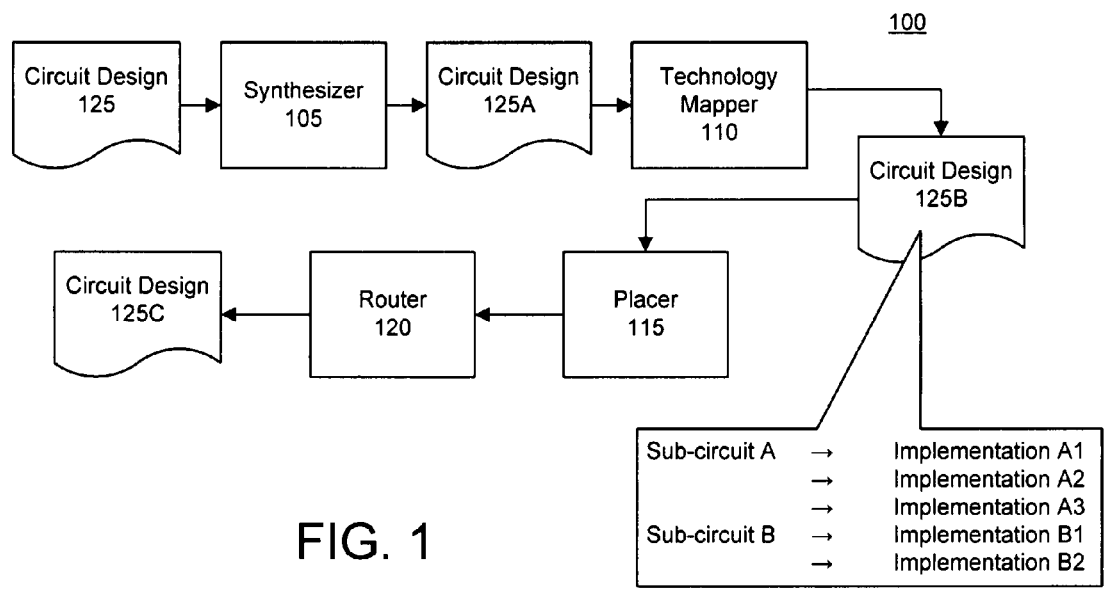
FIG. 1 is a block diagram illustrating exemplary components of an electronic design automation (EDA) tool for performing an implementation flow in accordance with one embodiment of the present invention.

FIG. 1 is a block diagram illustrating exemplary components of an electronic design automation (EDA) tool 100 for performing an implementation flow in accordance with one embodiment of the present invention. The components of the EDA tool 100 pictured in FIG. 1 can be used to implement a circuit design, e.g., circuit design 125, within a given target IC. For example, the EDA tool 100 can process a programmatic description of the circuit design 125 (hereafter "circuit design") for implementation within a programmable logic device (PLD) such as a field programmable gate array (FPGA).

As shown, the EDA tool 100 can include a synthesizer 105, a technology mapper 110, a placer 115, and a router 120. In general, the synthesizer 105 can process a conceptual Hardware Description Language (HDL) description of a circuit design, e.g., circuit design 125. The synthesizer 105 can generate and output a logical or physical representation of the circuit design 125 that is suited for the target IC, e.g., circuit design 125A. As used herein, "output" or "outputting" can include, but is not limited to, writing to a file, writing to a user display or other output device, playing audible notifications, sending or transmitting to another system, exporting, or the like. The technology mapper 110 can operate upon circuit design 125A and associate elements of the circuit design with programmable elements available for use within the target IC. In one embodiment, the technology mapper 110 can divide the circuit design 125A into a plurality of different sub-circuits. In another embodiment, the circuit design 125A may already be divided into various sub-circuits. The technology mapper 110 can determine one or more implementations for each of the sub-circuits.

An "implementation," as used herein, can refer to one or more programmable elements of the target IC to which one or more elements, e.g., a sub-circuit, of the circuit design 125A are mapped or otherwise associated. An implementation of a sub-circuit can define the actual hardware structures in the target IC, e.g., flip-flops, slice logic, lookup tables (LUTs), or the like, that will be used to implement the sub-circuit assigned to that implementation. The term "sub-circuit" as used herein, can refer to one or more nodes or elements of a circuit design that, taken together, are less than the entirety of the circuit design. For example, a sub-circuit can refer to a partition of the circuit design, a module of the circuit design, or a region of the circuit design, a sub-circuit as large as a logic cone with registered inputs/primary inputs and registered outputs/primary outputs, or a small group of LUTs implementing some specific combinational function.

The circuit design 125B that is output from the technology mapper 110 can specify a plurality of sub-circuits such as sub-circuit A and sub-circuit B. Sub-circuit A has been associated with, or technology mapped to, three different implementations, e.g., implementation A1, implementation A2, and implementation A3. Sub-circuit B has been associated with, or technology mapped to, implementation B1 and implementation B2. It should be appreciated that each sub-circuit can be associated with one or more implementations. As such, the examples disclosed herein are not intended to limit the embodiments disclosed herein or suggest any particular number of implementations for a sub-circuit.

Based upon one or more user-adjustable preferences, the EDA tool 100 can determine various types of implementations for each sub-circuit. For example, the technology mapper 110 can generate, for each sub-circuit, one or more implementations that have been optimized for reduced area, increased speed, reduced power consumption, or a combination of implementations relating to one or more of the optimizations described. The implementations can be sorted or ranked according to power consumption, timing, area usage, or any combination thereof. The top ranked implementation can be considered the preferred or primary implementation.

The technology mapper 110 can output circuit design 125B, which specifies one or more implementations for each sub-circuit. The technology mapper 110 can pass circuit design 125B to the placer 115 as input. The placer 115, can select a particular implementation for each of the sub-circuits. The placer 115 can analyze the placed circuit design with respect to timing, power consumption, area usage, other metrics, or any combination thereof. Based upon the analysis, one or more of the implementations for selected sub-circuits can be replaced with alternate implementations.

The placed circuit design can be output to the router 120. The router 120 can route signals of the circuit design and output a routed version of the circuit design 125C. Although not shown, the circuit design 125C can be further processed to generate a bitstream that, when loaded into the target IC, configures the target IC to implement the processed circuit design 125C.

Figure 2:
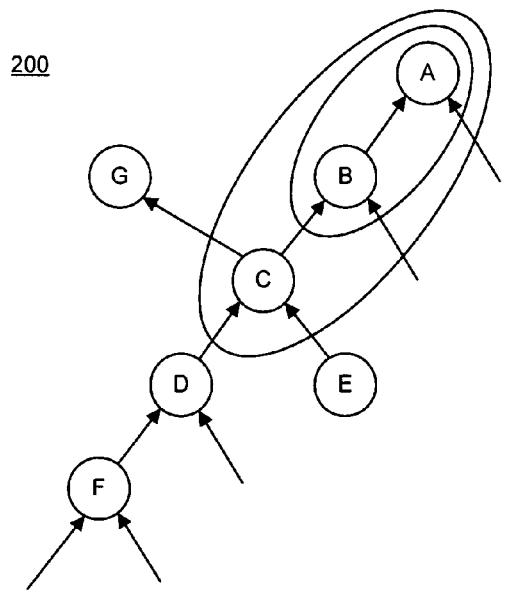
FIG. 2 is a directed acyclic graph representing a sub-circuit of a circuit design in accordance with another embodiment of the present invention.

FIG. 2 is a directed acyclic graph (DAG) 200 representing a sub-circuit of a circuit design in accordance with another embodiment of the present invention. Although the sub-circuit of FIG. 2 is illustrated in the form of a DAG, it should be appreciated that any of a variety of programmatic forms can be used, e.g., a netlist, a collection of files, or other formats with suitable annotations that convey the sub-circuit delineation and implementation information described herein.

Each of nodes A, B, C, D, E, F, and G of the DAG 200, as known, corresponds to one or more elements of the sub-circuit. Each node A-G can be technology mapped to an available element of the target IC. The nodes A-G can be mapped on a one-to-one basis. Alternatively, groups of one or more nodes can be formed and each group can be mapped to one or more elements of the target IC. For purposes of illustration, consider the case in which nodes A-G are mapped to slice logic of a PLD. More particularly, the nodes A-G can be mapped to lookup table (LUT) components of the PLD.

As is well known, some varieties of PLDs, for example, FPGAs, have programmable logic tiles called configurable logic blocks (CLBs). These CLBs can be further subdivided into one or more units of programmably configurable circuitry known as "slices." A plurality of slices may be disposed in each CLB, with one or more arrays more arrays of CLBs forming at least part of the programmably configurable circuitry of the FPGA. Depending upon the particular FPGA architecture used, a slice can include various programmable elements including one or more LUTs.

During technology mapping, the nodes of the DAG 200 can be assigned or mapped to particular elements of the target IC. This process can be implemented to produce a plurality of different implementations for each sub-circuit. In illustration, consider the case where a first implementation of the sub-circuit maps the group of nodes A and B to a same LUT of the target IC. A second implementation can technology map a group of nodes A, B, and C to a same LUT. The two groups, though sharing one or more nodes, are not equivalent. The second implementation will be faster than the first implementation as the arrival time from node E is reduced. The second implementation will require more area than the first implementation since node C will need to be replicated to drive node G.

The two implementations of the sub-circuit illustrated in FIG. 2 are functionally equivalent. The first implementation offers reduced area usage while the second implementation offers increased speed. Based upon the preferences established in the EDA tool, one implementation can be considered the primary implementation and the other an alternate implementation.

Though FIG. 2 has been described with reference to LUTs, the sub-circuit implementation techniques disclosed herein can be applied to other implementations, e.g., implementations that involve cores, implementations that involve only slice logic, and/or implementations that involve a combination of core and slice logic. Some FPGAs can be programmed to incorporate blocks with pre-designed functionalities, i.e., "cores." A core can include a predetermined set of configuration bits that program the FPGA to perform one or more functions. Alternatively, a core can include source code or schematics that describe the logic and connectivity of a design. Typical cores can provide, but are not limited to, digital signal processing (DSP) functions, memories, storage elements, and math functions. Some cores include an optimally floorplanned layout targeted to a specific family of FPGAs. Cores can also be parameterizable, i.e., allowing the user to enter parameters to activate or change certain core functionality.

In illustration, technology mapping a sub-circuit that performs a DSP function such as a Finite Impulse Response (FIR) filter typically results in mapping the sub-circuit to an implementation that utilizes a DSP48 block. A DSP48 block is a programmable circuit element available within selected FPGAs, e.g., the Virtex™-4 FPGA available from Xilinx, Inc. of San Jose, Calif. In many cases, utilizing the DSP48 block is an efficient usage of resources on the PLD. If, however, a significant number of DSP48 blocks are used by the circuit design, it may be more effective, from the perspective of the entire circuit design, to implement the FIR filter using slice logic, e.g., LUTs and carry chains. Alternatively or additionally, another implementation utilizing a combination of a core and slice logic can be implemented. For example, the technology mapper could generate one or more implementations from DSP48 blocks, one or more implementations utilizing only slice logic, and one or more implementations utilizing a combination of slice logic and DSP48 block(s). Particular implementations can be selected during placement according to the availability of the various circuit elements needed for each respective implementation in view of the entire circuit design.

Figure 3:
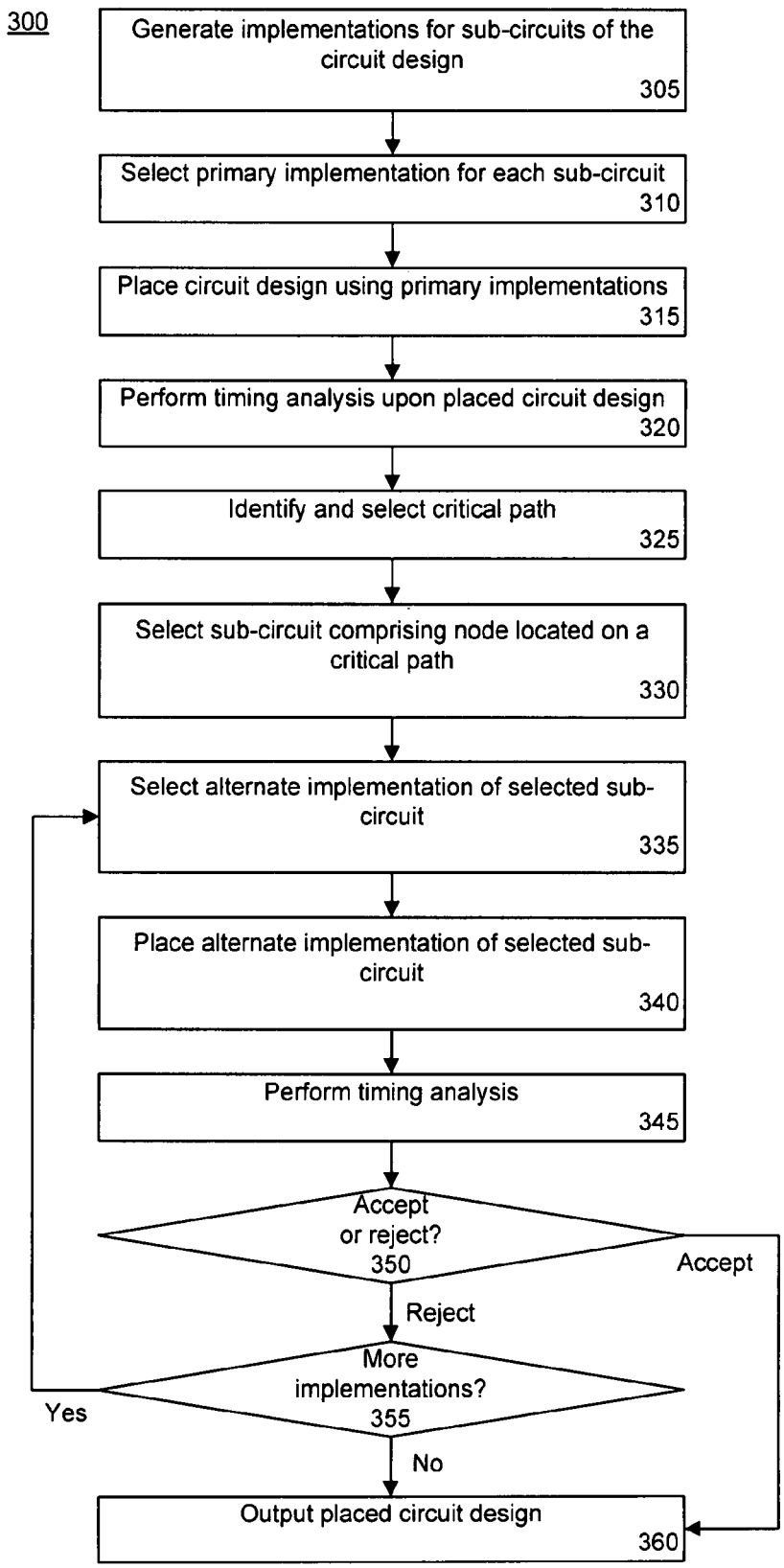
FIG. 3 is a flow chart illustrating a method of implementing a circuit design in accordance with another embodiment of the present invention.

FIG. 3 is a flow chart illustrating a method 300 of implementing a circuit design in accordance with another embodiment of the present invention. The method 300 can be implemented using an EDA tool as discussed with reference to FIGS. 1 and 2. The method 300 can begin in a state in which the circuit design has undergone synthesis and has been provided to a technology mapper. The method 300 represents an exemplary process relating to a single sub-circuit. It should be appreciated, however, the method 300 can be iteratively applied, e.g., to process multiple sub-circuits having nodes located on a critical path, if need be, as well as multiple critical paths, where processing can be discontinued when timing requirements are met.

Accordingly, in step 305, one or more implementations can be generated for each of the sub-circuits of the circuit design. In step 310, a primary implementation for each sub-circuit can be selected. The primary implementation can be selected according to power consumption, area usage, timing, or any combination thereof, e.g., using a cost function that can weigh the importance of one or more of the aforementioned attributes for each implementation.

In step 315, the circuit design can be placed using the primary implementation for each sub-circuit. In step 320, a timing analysis can be performed upon the placed circuit design. In step 325, a critical path of the circuit design can be identified and selected. A "critical path," as used herein, can refer to a signal path that does not meet a timing requirement. The criticality of a connection can be measured by the "slack" of a connection. Slack refers to the difference between the time a signal is to arrive at a particular destination to meet established design constraints and the actual time, or estimated time as determined by the EDA tool, at which the signal arrives. The more negative the slack, the more critical the connection. In some cases, a critical path can be one that has a slack that, although positive, is within a predetermined percentage, e.g., 10%, of the timing constraint.

In step 330, a sub-circuit that includes a node that is located on a critical path can be selected. In step 335, an alternate implementation for the selected sub-circuit can be selected. For example, the alternate implementation can be the next ranked implementation. In this example, a ranking of implementations can be made according to estimated timing of the implementations, where faster implementations, e.g., implementations with less delay, are ranked higher than implementations with greater delays. In other embodiments, no ranking of implementations is made.

In step 340, the alternate implementation of the sub-circuit can be placed on with respect to the target PLD. The primary implementation of the selected sub-circuit can be removed or purged from the placement and the alternate implementation of the selected sub-circuit can replace the primary implementation of the selected sub-circuit. In step 345, a further timing analysis can be performed upon the circuit design to determine whether the selected critical path passes timing requirement(s) or has, at least, reduced criticality.

A decision whether to accept or reject the alternate implementation in place of the primary implementation can be made in step 350. In one embodiment, if the criticality of the selected path is reduced, the alternate implementation can be accepted. In another embodiment, a cost function can be applied which takes into account any reduction in criticality. The alternate implementation can be accepted or rejected according to the result of the cost function. In still another embodiment, the alternate implementation can be accepted only if the timing requirements for the selected critical path are met.

If the alternate implementation is accepted, the method can proceed to step 360. If the alternate implementation is rejected, the method can proceed to step 355. In step 355, a determination can be made as to whether further alternate implementations for the selected sub-circuit remain. If so, the method can loop back to step 335 to select further alternate implementations for use in the placement of the circuit design. If no further alternate implementations remain, the method can proceed to step 360. Decision block 355 facilitates another embodiment in which each alternate implementation can be tried within the circuit design. The implementation for the selected sub-circuit which improves the timing of the selected critical path to the greatest degree can be chosen for use in placement of the circuit design.

In step 360, the placed circuit design can be output. If any design requirements were not met, the placed circuit design can be output with an indication that such requirement(s) were not met.

In another embodiment, one or more other evaluation metrics can be utilized in place of, or in combination with, timing. Cost functions can be used that seek to minimize power consumption, area usage, or any combination of power consumption, area usage, and timing when determining whether to replace a given implementation of a sub-circuit with another "alternate" implementation. For example, a given area of a circuit design can be evaluated to determine whether power consumption requirements are met. If not, one or more alternate implementations for one or more sub-circuits in the failing area can be tried in the placement. In such cases, alternate implementations can be accepted if the cost function improves when the alternate implementation is used.

In another embodiment, a cost function as described above can be applied to a selected area or region. When the cost function or other metric is not met by that region, an alternate implementation for each sub-circuit within that region can be selected and used for placement in lieu of the primary implementation. As noted, the alternate can be, for example, a second ranked implementation for each respective sub-circuit of the region. The results can be evaluated and the process can be iterated so that further alternates are used, or tried, for each sub-circuit of the region, if so desired, until the cost function or metric indicates a satisfactory result or until each alternate implementation for each sub-circuit is tried.

Figure 4:
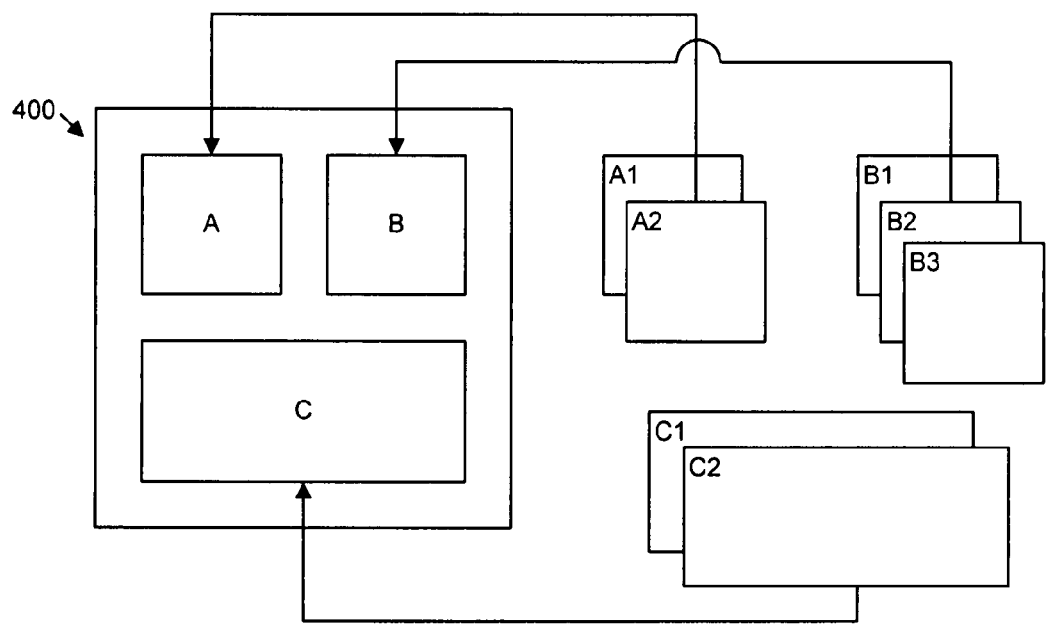
FIG. 4 is a block diagram illustrating the use of multiple implementations during placement in accordance with another embodiment of the present invention.

FIG. 4 is a block diagram illustrating the use of multiple implementations during placement in accordance with another embodiment of the present invention. FIG. 4 illustrates a case in which a target device 400 can be partially reconfigured. The target device 400 can include a region A that can be dynamically reconfigured to implement any one of a plurality of different functions, or sub-circuits.

During implementation of each function, or sub-circuit, of region A, different implementations for regions B and C can be swapped into and out of the placement to ensure that the each function, or sub-circuit, implemented within region A functions with each other implementation for regions B and C. This ensures that any of the functions for region A will function properly with any of implementations B1, B2, or B3 that may be selected for region B and function properly with either of implementations C1 and C2 that may be selected for region C.

FIG. 5 is a flow chart illustrating a method 500 of implementing a circuit design in accordance with another embodiment of the present invention. The method 500 can be implemented using an EDA tool as discussed with reference to FIGS. 1 and 2. The method 500 can begin in a state in which the circuit design has undergone synthesis and has been provided to a technology mapper. The method 500 represents an exemplary process relating to a single sub-circuit. It should be appreciated, however, that method 500 can be iteratively applied, e.g., to process multiple sub-circuits having nodes located on a critical path, if need be, as well as multiple critical paths, where processing can be discontinued when timing requirements are met.

Accordingly, the method can begin in step 505 where a plurality of implementations for each of one or more sub-circuits of the circuit design can be generated. In step 510, the circuit design can be placed. During placement, more than one placement for a given sub-circuit can be placed concurrently. For example, in the in the case where a sub-circuit can be assigned to a particular LUT on the target device, each implementation choice for the LUT can be assigned an area penalty such as "X/N" wherein the original area penalty is denoted as "X" and "N" represents the number of implementation choices for that LUT. A LUT associated with more than one implementation can be referred to as a "choice LUT."

Signals with a fanout to a choice LUT can be assigned a fanout cost that can be adjusted such that routing the signal to a choice LUT is less expensive than routing the signal to a LUT without a choice. Placement can be performed where the nodes can be placed in an overlap mode. For example, consider the case illustrated with respect to FIG. 2, in which nodes A and B can be mapped to a single LUT (implementation 1) or nodes A, B, and C can be mapped to a single LUT (implementation 2). The placer can assign implementation 1 to ½ of a particular LUT and allocate the other ½ of the same LUT to implementation 2. By placing multiple implementations for one or more sub-circuits concurrently, the placement of the circuit design will specify a plurality of placements.

An "overlap mode," in general, refers to a mode in which an EDA tool can assign elements of the circuit design to specific elements, and thus locations, of the target IC. In overlap mode, more than one element of the circuit design can be assigned to a same element of the target IC. As processing of the circuit design continues, instances of "overlap" can be removed as any overlap remaining in the circuit design results in an "infeasible" or "illegal" circuit design.

In step 515, a first legalization process can be applied to the circuit design. During the first legalization process, sub-circuits can be moved so that only choice LUTs overlap. Non-choice LUTs will not overlap after step 515. In step 520, the number of choice LUTs optionally can be restricted or pruned. For example, a timing analysis can be performed to identify a timing critical region of the circuit design, e.g., a signal path having timing that is within some predetermined percentage, e.g., 10%, of critical slack. Choice LUTs located outside of the identified region can be removed from the placement.

In step 525, a second legalization process can be applied to the circuit design. During the second legalization process, the identified critical path or network can be traversed. A combinational output point, e.g., an input to a sequential element of the path or network, can be selected. The path from the selected point can be traversed backward. When a LUT on the path is approached, both paths coming from the choice LUTs can be evaluated to identify the choice LUT that produces a better, e.g., faster, timing result. Multiple backward and/or forward traversals can be performed to identify the choice LUTs that will be used for the network, e.g., those that provide better timing. Those not selected can be deleted from the placement. In step 530, a placed circuit design can be output.

It should be appreciated that while the method of FIG. 5 has been described with reference to timing, the same functionality can be applied using other cost metrics such as power consumption or area usage to locate "critical" regions and select choice LUTs for use during placement.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of implementing a circuit design within a target integrated circuit (IC), the method comprising:
   executing a program on a computer system, wherein execution of the program causes the computer system to perform operations including:
   during technology mapping of the circuit design, determining a respective plurality of implementations of a plurality of sub-circuits of the circuit design;
   retaining each respective plurality of implementations;
   for each sub-circuit having the respective plurality of implementations, selecting a primary implementation from the retained respective plurality of implementations;
   placing the circuit design on the target IC using each primary implementation of each sub-circuit having the respective plurality of implementations;
   after the placing, identifying a portion of the circuit design that does not conform to a design constraint;
   selecting from the identified portion the sub-circuit having a respective plurality of implementations;
   selecting a respective alternate implementation of the selected sub-circuit from the retained respective plurality of implementations;
   replacing the primary implementation of the selected sub-circuit with the selected alternate implementation, wherein determining the respective plurality of implementations comprises determining the respective plurality of implementations for each of the plurality of sub-circuits of a selected region of the circuit design, and wherein replacing the primary implementation comprises replacing each primary implementation of each sub-circuit of the selected region with a respective alternate implementation of the sub-circuit; and
   outputting the placed circuit design after the replacing.

2. The computer-implemented method of claim 1, wherein the selected sub-circuit comprises a plurality of nodes of the circuit design, and wherein determining the respective plurality of implementations comprises:
   mapping a first group of nodes of the selected sub-circuit to at least one lookup table forming the primary implementation; and
   mapping a second group of nodes of the selected sub-circuit to at least one lookup table forming the alternate implementation, wherein the first group of nodes is not equal to the second group of nodes.

3. The computer-implemented method of claim 1, wherein the identifying the portion of the circuit design that does not conform to the design constraint comprises:
   performing a timing analysis upon the placed circuit design;
   identifying a critical path of the circuit design; and
   wherein the selected sub-circuit comprises a node of the critical path.

4. The computer-implemented method of claim 3, further comprising accepting the alternate implementation of the selected sub-circuit according to a further timing analysis of the placed circuit design comprising the alternate implementation of the selected sub-circuit.

5. The computer-implemented method of claim 1, further comprising:
   during the technology mapping, generating a circuit description that specifies the respective pluralities of implementations of the sub-circuits; and
   providing the circuit description specifying the pluralities of implementations to a placer.

6. The computer-implemented method of claim 1, wherein determining the respective plurality of implementations comprises:
   determining an implementation for one or more of the plurality of sub-circuits comprising slice logic; and
   determining another implementation for the one or more of the plurality of sub-circuits comprising non-slice logic.

7. The computer-implemented method of claim 6, wherein determining the respective plurality of implementations further comprises determining an implementation comprising a combination of slice logic and non-slice logic.

8. A computer program product, comprising:
   a computer-usable storage medium having computer-usable program code that implements a circuit design within a target integrated circuit (IC), the computer-usable medium comprising:
   computer-usable program code that, during technology mapping of the circuit design, determines a respective plurality of implementations of a plurality of sub-circuits of the circuit design;
   computer-usable program code that retains each respective plurality of implementations;
   computer-usable program code that, for each sub-circuit having the respective plurality of implementations, selects a primary implementation from the retained respective plurality of implementations;
   computer-usable program code that places the circuit design on the target IC using each primary implementation of each sub-circuit having the respective plurality of implementations;
   computer-usable program code that after the placing, identifies a portion of the circuit design that does not conform to a design constraint;
   computer-usable program code that selects from the identified portion a sub-circuit having the respective plurality of implementations;
   computer-usable program code that selects a respective alternate implementation of the selected sub-circuit from the retained respective plurality of implementations;
   computer-usable program code that replaces the primary implementation of the selected sub-circuit with the selected alternate implementation; and
   computer-usable program code that outputs the placed circuit design, wherein the computer-usable program code that determines the respective plurality of implementations comprises computer-usable program code that determines the respective plurality of implementations for each of the plurality of sub-circuits of a selected region of the circuit design, and wherein the computer-usable program code that selectively replaces the primary implementation comprises computer-usable program code that replaces each primary implementation of each sub-circuit of the selected region with a respective alternate implementation of the sub-circuit after the replacing.

9. The computer program product of claim 8, wherein the selected sub-circuit comprises a plurality of nodes of the circuit design, and wherein the computer-usable program code that determines a plurality of implementations comprises:

computer-usable program code that maps a first group of nodes of the selected sub-circuit to at least one lookup table forming the primary implementation; and computer-usable program code that maps a second group of nodes of the selected sub-circuit to at least one lookup table forming the alternate implementation, wherein the first group of nodes is not equal to the second group of nodes.

10. The computer program product of claim 8, wherein the identifying the portion of the circuit design that does not conform to the design constraint comprises:

computer-usable program code that performs a timing analysis upon the placed circuit design; and computer-usable program code that identifies a critical path of the circuit design;

wherein the selected sub-circuit comprises a node of the critical path.

11. The computer program product of claim 10, further comprising computer-usable program code that accepts the alternate implementation of the selected sub-circuit according to a timing analysis of the placed circuit design comprising the alternate implementation of the selected sub-circuit.

12. The computer program product of claim 8, wherein the computer-usable program code that determines the respective plurality of implementations comprises at least one of computer-usable program code that determines an implementation for one or more of the plurality of sub-circuits comprising slice logic, computer-usable program code that determines an implementation for the one or more of the plurality of sub-circuits comprising non-slice logic, or computer-usable program code that determines an implementation for the one or more of the plurality of sub-circuits comprising a combination of slice logic and non-slice logic.

* * * * *